United States Patent
Brooks

(10) Patent No.: US 6,879,819 B2
(45) Date of Patent: Apr. 12, 2005

(54) CONTROL AND MESSAGING DURING EMERGENCY CALLS

(75) Inventor: Frank Brooks, Vista, CA (US)

(73) Assignee: Denso Corporation, Kariya (JP)

( * ) Notice: Subject to any disclaimer, the term of this patent is extended or adjusted under 35 U.S.C. 154(b) by 481 days.

(21) Appl. No.: 09/892,133

(22) Filed: Jun. 25, 2001

(65) Prior Publication Data
US 2002/0197977 A1 Dec. 26, 2002

(51) Int. Cl.[7] ................................................ H04Q 7/20
(52) U.S. Cl. ..................... 455/404.1; 455/466; 455/450
(58) Field of Search ............................. 455/404.1, 466, 455/450, 404.2, 566, 567, 412.2, 517; 340/901, 902, 903, 438, 436, 573.1, 825; 379/37–45, 216.1, 51; 705/1

(56) References Cited
U.S. PATENT DOCUMENTS

| | | | | | |
|---|---|---|---|---|---|
| 3,723,876 A | * | 3/1973 | Seaborn, Jr. | ................. | 455/18 |
| 5,694,452 A | * | 12/1997 | Bertolet | ........................ | 379/51 |
| 5,953,650 A | * | 9/1999 | Villevieille | .............. | 455/404.2 |
| 6,292,687 B1 | * | 9/2001 | Lowell et al. | .............. | 600/515 |
| 6,397,054 B1 | * | 5/2002 | Hoirup et al. | ........... | 455/404.1 |
| 6,510,207 B1 | * | 1/2003 | Cannon et al. | ................ | 379/68 |

\* cited by examiner

*Primary Examiner*—Jean A Gelin
(74) *Attorney, Agent, or Firm*—Harness, Dickey & Pierce, PLC

(57) ABSTRACT

An enhanced emergency call system allows for the emergency dispatcher to capture and control the call. When the dispatcher captures the call, the caller would be precluded from terminating the call without authorization from the dispatcher. A set of standard codes may be used to indicate the type of emergency in the event the caller is unable, or desires not to speak. The dispatcher may also use messaging services to communicate with the caller. The caller may respond using the messaging services, or the dispatcher may prompt the caller for a response.

18 Claims, 4 Drawing Sheets

| Code | Emergency |
|---|---|
| 01 | Fire |
| 02 | Injury |
| 03 | Choking |
| 04 | Dangerous Driver |
| 05 | Car Accident |
| 06 | Intruder |
| 07 | Robbery |
| ● | |
| ● | |
| ● | |

Figure 4

CONTROL AND MESSAGING DURING EMERGENCY CALLS

TECHNICAL FIELD

This invention relates to emergency calls, and more particularly to providing enhanced control and standardized messaging during emergency calls.

BACKGROUND

Cellular radiotelephones have become increasingly popular for many different reasons, including their potential availability in case of emergency. However, conventional cellular phones may not adequately meet emergency communication service needs because they are designed to achieve goals other than providing emergency communication services.

Emergency communication services differ from normal communication services. Emergency communication services are seldom needed, but when they are needed it is desirable that they be highly reliable and dependable. Emergency situations often are accompanied by extreme stress or panic on the part of callers, and very little mental or physical effort on the part of a caller is desirable in obtaining emergency communication services.

A recent development in mobile cellular systems is the ability to transfer short messages between an application residing on a mobile station and another application residing on a mobile network element, such as a message center for example. This service is sometimes referred to as a SMS (short message service). These messages might include mobile originated point-to-point messages, mobile terminated point-to-point, and broadcast for example.

SUMMARY

An enhanced emergency call system allows for the emergency dispatcher to capture and control the call. When the dispatcher captures the call, the caller would be precluded from terminating the call without authorization from the dispatcher. A set of standard codes may be used to indicate the type of emergency in the event the caller is unable, or desires not to speak. The dispatcher may also use messaging services to communicate with the caller. The caller may respond using the messaging services, or the dispatcher may prompt the caller for a response.

DESCRIPTION OF DRAWINGS

These and other features and advantages of the invention will become more apparent upon reading the following detailed description and upon reference to the accompanying drawings.

FIG. 4 is a chart showing an example of emergency codes according to one embodiment of the invention.

DETAILED DESCRIPTION

Figure 1:
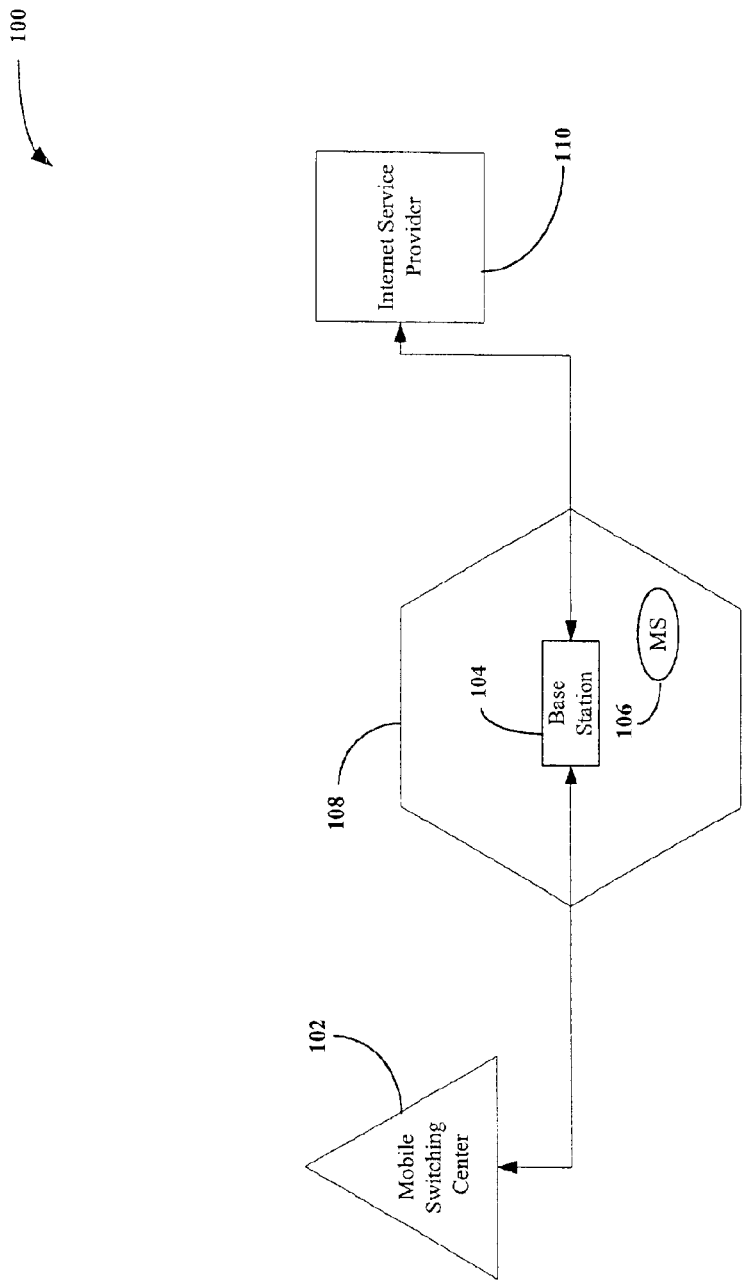
FIG. 1 illustrates components of a wireless communication system appropriate for use with an embodiment of the invention.

FIG. 1 illustrates components of a wireless communication system 100. A mobile switching center 102 communicates with a base station 104. The base station 104 broadcasts data to and receives data from mobile stations 106 within a cell 108. The cell 108 is a geographic region, roughly hexagonal, having a radius of up to 35 kilometers or possibly more. The base station 104 may also communicate with an Internet Service Provider (ISP) 110. The ISP 110 provides an interface between the wireless communication system 100 and the world wide web, or Internet. In some embodiments, the mobile station 106 communicates with the ISP 110 through the base station 104. However, it can be appreciated that the mobile station 106 may directly communicate with the ISP 110.

One technique used by the mobile station 106 to interface with the wireless communication system is the Wireless Application Protocol (WAP). WAP sends multiple WEB pages, for example, in a single transmission as a "deck" of "cards," each card corresponding to a page of structured content and navigation specifications. The use of WAP along with SMS provides one technique for communication of short messages to the mobile station 106.

The mobile station 106 is capable of receiving data from and transmitting data to a base station 104. Additional cells adjacent to the cell 108 permit mobile stations 106 to cross cell boundaries without interrupting communications. This is because base stations 104 in adjacent cells assume the task of transmitting and receiving data for the mobile stations 106. The mobile switching center 102 coordinates all communication to and from mobile stations 106 in a multi-cell region, thus the mobile switching center 102 may communicate with many base stations 104.

The mobile stations 106 may move about freely within the cell 108 while communicating either voice or data. The mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone synchronizes communication with the base station 104. The cellular telephone then registers with the mobile switching center 102 to make itself known as an active user within the wireless network.

The mobile station 106 scans data frames broadcast by the base station 104 to detect any telephone calls or paging messages directed to the cellular telephone. In this call detection mode, the mobile station 106 receives, stores and examines paging message data, and determines whether the data contains an identifier matching an identifier of the mobile station 106. If a match is detected, the mobile station 106 establishes a call with the mobile switching center 102 via the base station 104. If no match is detected, the mobile station 106 enters an idle state for a predetermined period of time, then exits the idle state to receive another transmission of paging message data.

Figure 2:
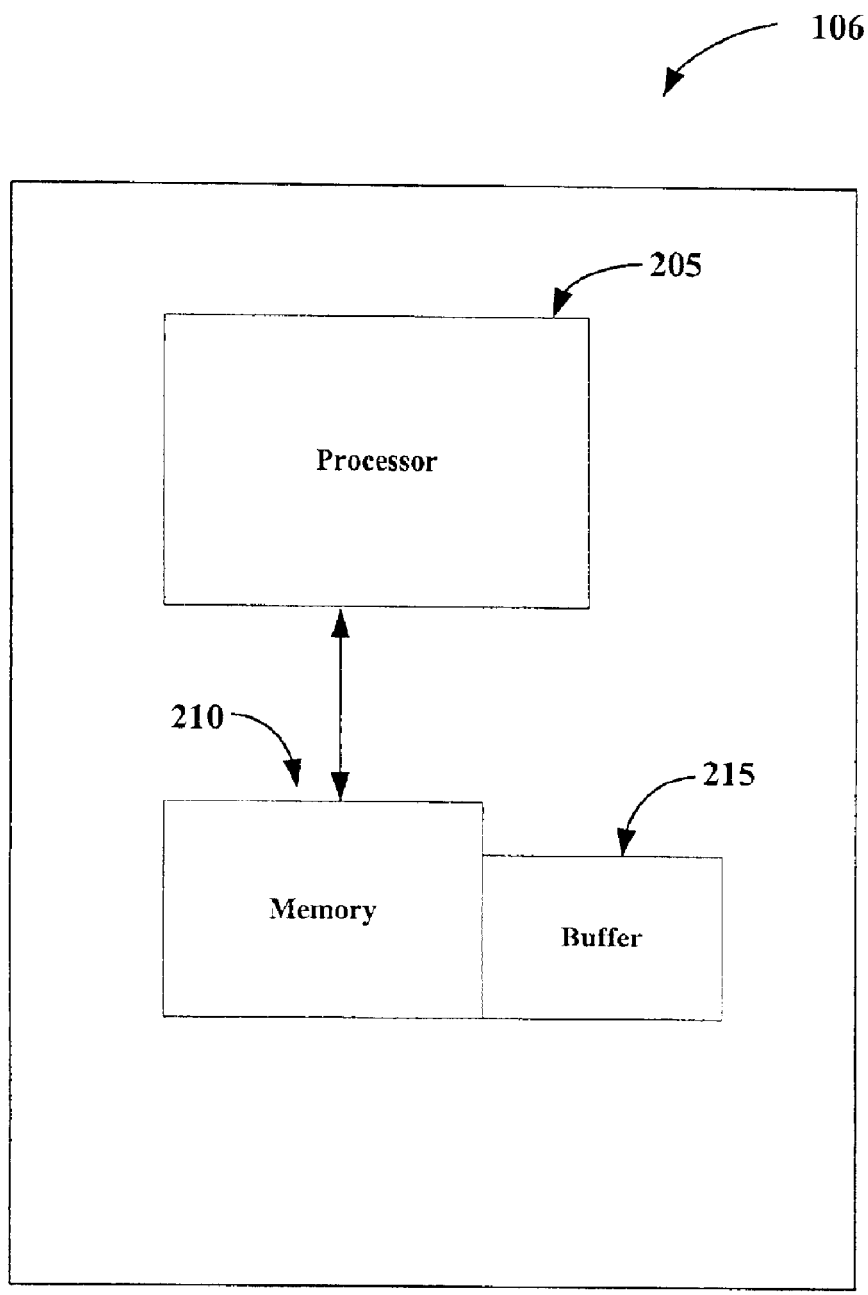
FIG. 2 is a block diagram showing features of a mobile station according to one embodiment of the invention.

FIG. 2 shows a block diagram of the mobile station 106 and the processing that occurs in that mobile station 106. A processor 205 is driven by programs stored in a memory 210. Any information received by the mobile station 106 may be stored in the memory 210 or a buffer 215. The buffer 215 may store information obtained from the Internet service provider 110.

Figure 3:
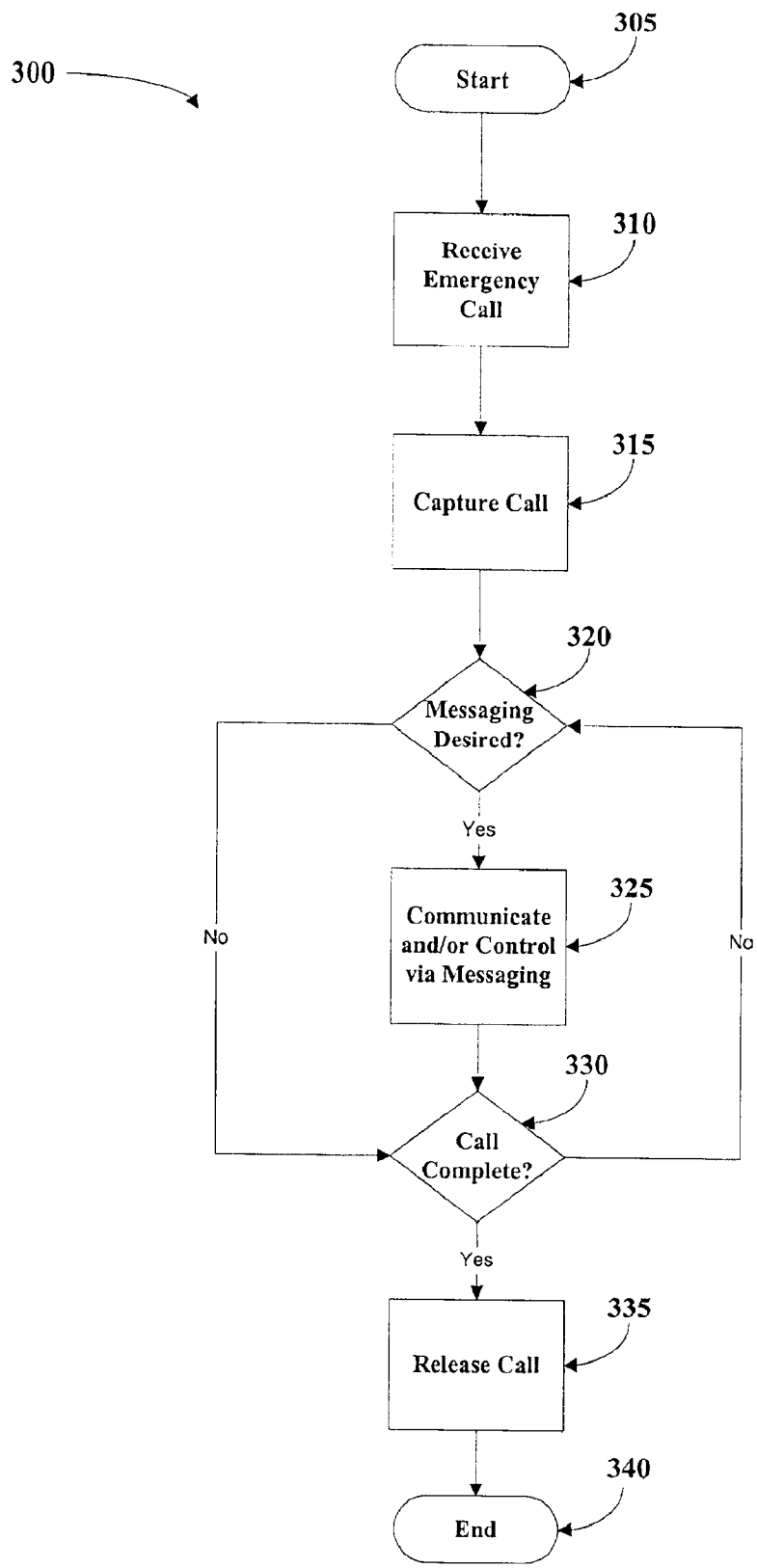
FIG. 3 is a flowchart showing the process used by the communication system to control the emergency call according to one embodiment of the invention.

FIG. 3 is a flowchart showing the process 300 the communication system 100 uses to distribute emergency messages. The process 300 begins in a START block 305. Proceeding to block 310, the communication system 100 receives an emergency call from the network. An emergency call may be initiated by a user on a mobile station 106 dialing 911 or any other designated emergency number. The network recognizes the emergency number and identifies the call as an emergency call.

Proceeding to block 315, the emergency dispatcher in the communication system 100 may capture the emergency call. By capturing the call, the communication system 100 may prevent the mobile station 106 from disconnecting the call. This allows the dispatcher to determine when it may be safe to end the call. The dispatcher may also activate any messaging features on captured calls.

Proceeding to block 320, the process 300 determines if communication via the messaging system is desired. Messaging may be activated by either the dispatcher, the user, or by the communication system 100. The communication system may use any for of messaging, such as SMS or DTMF messages. If messaging is not desired, the call may continue using normal voice communications and the process 300 proceeds along the NO branch to block 330. If messaging is desired, the process 300 proceeds along the YES branch to block 325. In block 325, communications and/or control commands are transmitted via messaging.

The dispatcher may conduct a variety of communications or controls via messaging. For example, the dispatcher may transmit a message causing the mobile station 106 to alert the user, such as by ringing or vibrating. The message may even indicate whether the mobile station 106 rings at a low, medium, or high volume level. This feature may be advantageous if the dispatcher desires to inform the user that the dispatcher has returned to the call. Further, the dispatcher may ring the mobile station 106 to assist rescue workers in locating the user. This may be helpful in situations where the user is unable to respond to any requests.

The dispatcher may also use the messaging system to communicate with the mobile station 106. For example, the dispatcher may user DTMF messages to query the user if the user is unable to talk. The dispatcher may send questions (such as yes/no or multiple choice) that can be answered by pressing buttons on the keypad. Thus, the dispatcher may be able to obtain information such as "Is there a burglar in the house now?" without requiring the caller to speak and reveal a hiding place. The dispatcher may also use SMS messages to achieve a similar result. The dispatcher may send an SMS message requesting the nature of the emergency, and whether it is safe for the user to make noise. The SMS messages may use graphical characters where available to overcome reading or language barriers.

The dispatcher may also use the messaging system to query the user to pinpoint the location of the user for rescue purposed. If location information is available, the dispatcher may begin with that information. Determination of the position of a mobile station 106 may be accomplished in a variety of manners known in the art, such as global positioning, triangulation, etc. and will not be discussed herein. For example, the position information obtained from the mobile station 106 may indicate the user is in a house. The dispatcher may then use the messaging system to determine the precise location in the house. Such information may then be used by fire, police, or other rescue personnel to aid the caller.

The caller may also append a code to the original call to indicate the nature of the emergency. FIG. 4 illustrates an exemplary table of codes that may be appended to the emergency call. For example, a two digit code may be used, thus providing a large range of emergencies that may be identified. However, the two digit code may be small enough for children to memorize. Thus, if a caller was placing the emergency call due to a fire, the caller may dial "911-01." This dispatcher would then immediately know the emergency call concerns a fire.

Proceeding to block 330, the process 300 determines if the call is complete. As stated above, when the dispatcher captures the call, the mobile station 106 may be prevented from disconnecting the call. Thus, the mobile station 106 may only request the call be disconnected, and the call will remain connected until the dispatcher determines it is appropriate to terminate. If the call is not complete, the process 300 proceeds along the NO branch back to block 320 to continue communicating. If the call is complete, the process 300 proceeds along the YES branch to block 335. In block 335, the dispatcher releases the call to allow the mobile station 106 to terminate the connection. The process 300 then terminates in an END block 340.

Numerous variations and modifications of the invention will become readily apparent to those skilled in the art. For example, although the invention is described with reference to a mobile communication system, it can be appreciated that the present invention may also be used with a land based communication system. Accordingly, the invention may be embodied in other specific forms without departing from its spirit or essential characteristics.

What is claimed is:

1. A method of managing an emergency call, the method comprising:

capturing an origination of the emergency call at an emergency dispatcher;

establishing voice communication between a remote station and the emergency dispatcher when the emergency dispatcher captures the emergency call;

determining whether messaging is desired during the voice communication; and communicating with the remote station using a messaging system without terminating the emergency call when the messaging is desired.

2. The method of claim 1, further comprising determining the nature of the emergency by decoding dialed numbers.

3. The method of claim 1, further comprising transmitting questions to the remote station using the messaging system.

4. The method of claim 1, further comprising transmitting controls to the remote station, thereby causing the remote station to ring.

5. The method of claim 1, further comprising displaying questions to the remote station based on the content of transmitted messages.

6. The method of claim 5, further comprising converting the messages to graphical characters.

7. The method of claim 1, wherein the determining step determines that the messaging is desired when it is required to obtain information from the mobile station without speaking.

8. The method of claim 1, further comprising:

determining whether the messaging is not desired during the communication using the messaging system; and switching from the communication using the messaging system to the voice communication when the messaging is not desired.

9. The method of claim 1, further comprising:

switching from the voice communication to the communication using the messaging system to obtain information from the remote station without speaking.

10. A communication system comprising:

a voice communication system that transmits verbal messages;

a messaging system that transmits non-verbal messages;

a remote station which initiates an emergency call and communicates via the voice communication system and the messaging system; and an emergency dispatcher which receives and captures the emergency call and communicates with the remote station via the voice communication system and the messaging system, wherein the emergency dispatcher includes:

means for capturing an origination of the emergency call;

means for establishing voice communication with the remote station via the voice communication system when the emergency dispatcher captures the emergency call;

means for determining whether messaging is desired during the voice communication; and means for communicating with the remote station using the messaging system without terminating the emergency call when the messaging is desired.

11. The communication system of claim 10, wherein the emergency dispatcher controls release of the emergency call.

12. The communication system of claim 10, wherein the messaging system uses the short messaging service.

13. The communication system of claim 10, wherein the messaging system uses the DTMF messages.

14. The communication system of claim 10, wherein the remote station appends a code to an emergency number to identify the nature of the emergency.

15. The communication system of claim 10, wherein the remote station responds to the messages using a telephone keypad.

16. The communication system of claim 10, wherein the determining means determines that the messaging is desired when it is required to obtain information from the mobile station without speaking.

17. The communication system of claim 10, further comprising:

means for determining whether the messaging is not desired during the communication using the messaging system; and means for switching from the communication using the messaging system to the voice communication when the messaging is not desired.

18. The communication system of claim 10, further comprising:

means for switching from the voice communication to the communication using the messaging system to obtain information from the remote station without speaking.

* * * * *